United States Patent [19]

Rector et al.

[11] 4,274,751
[45] Jun. 23, 1981

[54] SCRAPED WALL AGITATOR

[75] Inventors: James L. Rector, Vienna, W. Va.; Paul R. Weber, Wilmington, Del.

[73] Assignee: E. I. Du Pont de Nemours and Company, Wilmington, Del.

[21] Appl. No.: 134,228

[22] Filed: Mar. 26, 1980

[51] Int. Cl.³ .............................................. B01F 7/24
[52] U.S. Cl. .................................. 366/310; 198/664; 198/676; 366/313; 366/319; 366/320
[58] Field of Search .............. 366/310, 313, 319, 320; 198/664, 676; 165/94

[56] References Cited

U.S. PATENT DOCUMENTS

| 301,506 | 7/1884 | Massey | 198/676 |
| 1,028,934 | 6/1912 | Coppage | 198/676 X |
| 1,966,325 | 7/1934 | Welch | 415/72 |
| 3,194,385 | 7/1965 | Barnese | 198/676 X |

FOREIGN PATENT DOCUMENTS 749229 12/1966 Canada .................................... 366/319

Primary Examiner—Philip R. Coe

[57] ABSTRACT

An agitator wiper for a tubular chemical vessel in which agitation of the vessel contents is achieved by a blade positioned helically around a central rotating shaft and wiping of the vessel walls is achieved by segmented plates positioned along the blade and constructed to provide wiper tips which wipe all portions of the vessel walls.

3 Claims, 4 Drawing Figures

SCRAPED WALL AGITATOR

BACKGROUND OF THE INVENTION

In many chemical vessels it is necessary to provide mixing by the use of an axial rotating agitator. An example of such a vessel is a reactor used in producing polymer from monomer or in making pigments. In such vessels, it is desirable to wipe or scrape the internal wall of the vessel to minimize solids buildup and to increase heat transfer through the wall.

Experience has shown that wiping the interior of the wall using full length axially oriented wiper, has adverse effects on the effectiveness of the mixing of the contents of the vessel. Use of axially oriented wiper blades interferes with efficient agitation and causes temperature differentials within the contents of the vessel, which interfere with uniform processing and hinder attaining optimum conversion rates. In the design of a tubular vessel for optimum mixing and wall scraping, it is desirable to provide a helical agitator which rotates internally about the vessel axis. Such an arrangement is shown in Welch U.S. Pat. No. 1,966,325 and Barnese U.S. Pat. No. 3,194,385, which depicts helical conveyor screws having edges which wipe the interior walls of the vessel. Massey U.S. Pat. No. 301,506 employs spaced rigid cutters along a helical conveyor screw, while Coppage U.S. Pat. No. 1,028,934 forms the helix of rigid overlapping segments of his conveyor screw.

There are practical limitations on the design and construction of wipers on a helical agitator which act to limit transfer of the conveyor screw systems of the above-discussed patents into a wiper-agitator system. One limitation is that the wiper configuration needs not only to be helical, to match the helical agitator, but needs also to be flexible. A fixed helical blade possesses such a degree of stiffness that it cannot flex readily to contact the wall at all portions thereof. This stiffness prevents controlled deflection against the vessel wall so that a specific wiper-to-wall contact force cannot be obtained, and often results in wear or other damage to the vessel interior surface. In addition, controlled deflection wipers that deviate greatly from the helical configuration interfere with efficiency of the mixing action.

More specifically, the present invention is described as follows:

In a tubular vessel, an agitator to mix the contents of the vessel and to clean the wall of the vessel, which agitator comprises (1) a shaft axially and centrally positioned in the vessel, which shaft is connectable to an outside rotational drive source, (2) at least one spiral blade positioned helically around the shaft and supported away from the shaft by rigid supporting arms attached to the blade and the shaft, such blade proportioned in length and diameter to impel the contents in predetermined motion, (3) a series of straight plate segments spaced at predetermined uniform intervals along the blade and attached to the blade such that the segments extend from the blade toward the interior wall of the tubular vessel, the plane of each plate relative to the axis of rotation being approximately the same angle as the helix angle of the periphery of the blade, but the plane of the plate relative to the helical blade being positioned to slant either away from or toward the direction of rotation of the shaft, said plate being constructed to flex with predetermined controlled pressure at the interior wall, and (4) a flexible tip attached to the end of each segment and positioned and contoured such that by overlap of each tip with respect to the adjacent tip ends, all portions of the interior wall of the tubular vessel are contacted during a single revolution of the shaft.

DESCRIPTION OF THE INVENTION

Figure 1:
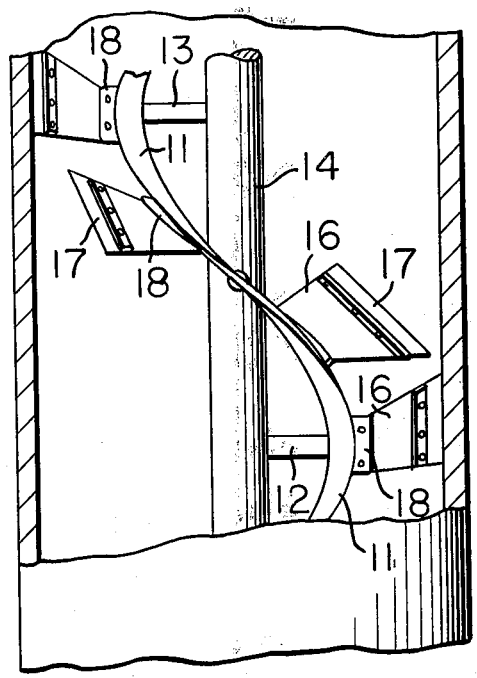
FIG. 1 is a side view of a tubular vessel in which the vessel wall has been partially cut away to show the helical blade and plate segments position.

There is shown in FIG. 1 a tubular vessel 10 and a blade 11 positioned helically inside the vessel. The tubular vessel may be cone shaped but is preferably cylindrical. Blade 11 is supported within vessel 10 by radial arms, represented by 12 and 13, spaced along shaft 14 which is axially located within the vessel and which is connected to a drive source (not shown) for rotation within the vessel. Blade 11 is usually made of metal, such as stainless steel.

Figure 2:
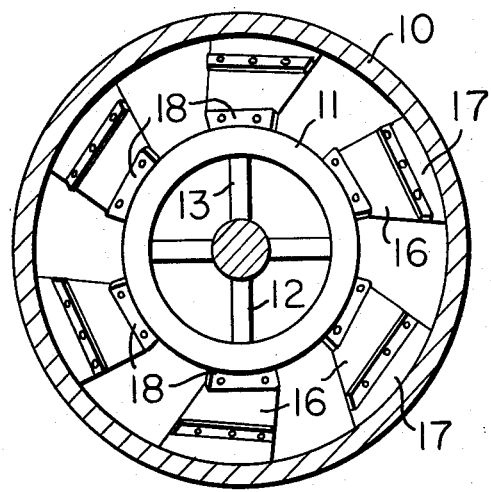
FIG. 2 is a top view of FIG. 1 in which the vessel wall has not been cut away.
Figure 3:
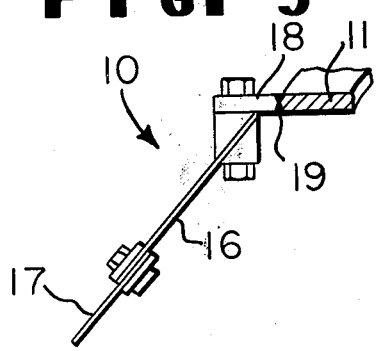
FIG. 3 is a sectional view of one segment attached to the blade.
Figure 4:
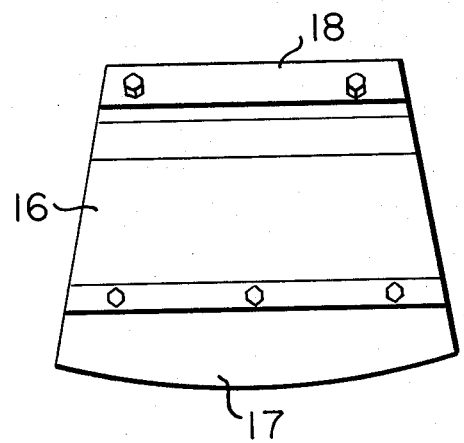
FIG. 4 is a top view of the segment shown in FIG. 3.

Secured to the outer periphery of blade 11 are a series of scrapers 15. Each scraper 15 comprises a straight (or flat) flexible metal plate 16 and a replaceable, flexible wiper tip 17 made of a material such as that made from "Teflon" polytetrafluoroethylene molding resin. Plate 16 is attached to and extends from blade 11 toward the wall of vessel 10 but is slanted slightly away from the direction of rotation as shown in FIGS. 1 and 2. Wiper tip 17 can be angled away from plate 16 to contact the vessel wall with a less than 90° angle during rotation of the shaft 14. The inner edge of plate 16 is short relative to the circumference of rotor blade 11 so that, although each plate is flat, the series of plates substantially conforms to the helical shape of blade 11. Plates 16 are attached to blade 11 at predetermined intervals and are wedge shaped so that even though the plates are spaced apart, the wiping action of each overlaps slightly the adjacent tips at the wall of the vessel. Consequently, when blade 11 is rotated one revolution about its vertical shaft 14 the entire vessel wall is contacted by wiper tips 17. Wiper tips 17 are shaped as part of an ellipse to conform to the shape of the vessel wall. Wiper tips 17 can be secured to plates 16 by means of screws to allow ease in changing worn tips. Plate 16 can be attached to blade 11 by any convenient means, e.g., by bolts or by attachment to member 18 which is welded at 19 to blade 11.

In operation, shaft 14 is rotated (counterclockwise as shown in FIG. 2) which causes rotation of blade 11. Wiper tips 17 contact the vessel wall and scrape off deposited material thereon. Metal plate 16 flexes during rotation to conform to the vessel wall.

It is important that the metal plate 16 be flexible to act as a spring and thus maintain the necessary unit force loading between the wiper tips and the vessel wall. In addition, where the tubular vessel is not a true cylinder due to manufacturing defects or due to hard solids deposits on the wall, the flexible plates aid in maintaining contact between the wiper tip and the vessel wall.

Removal and replacement of the rotor assembly is facilitated by this scraper design in the following way. When shaft 14 is pulled out of the vessel 10 upwardly, plate 16 flexes and prevents the wiper tips 17 from jamming against the vessel wall. When the shaft is being reinserted into the vessel, wiper tips 17 deflect to prevent jamming. This two-way flexing permits vertical movement of the assembly without rotational movement.

The agitator described herein permits good agitation through rotation of the helically positioned blade, and at the same time permits good wiping of the interior walls of the vessel through the spaced plates attached along the outer periphery of the blade coupled with their wedge shape which culminates in wiper tips that achieve complete wiping of the vessel walls during one revolution of the blade.

The agitator of this invention can be used in any tubular chemical vessel in which solids tend to accumulate on the walls of the vessel. Thus the agitator is useful in the vat production of organic dyes or pigments, and in the production of polymers from monomers in which the reaction mass is or becomes viscous and the like.

We claim:

1. In a tubular vessel, an agitator to mix the contents of the vessel and to clean the wall of the vessel, which agitator comprises
   (a) a shaft axially and centrally positioned in the vessel, which shaft is connectable to an outside rotational drive source,
   (b) at least one spiral blade positioned helically around the shaft and supported away from the shaft by rigid supporting arms attached to the blade and the shaft, such blade proportioned in length and diameter to impel the contents in predetermined motion,
   (c) a series of straight plate segments spaced at predetermined uniform intervals along the blade and attached to the blade such that the segments extend from the blade toward the interior wall of the tubular vessel, the plane of each plate relative to axis of rotation being approximately the same angle as the helix angle of the periphery of the blade, but the plane of the plate relative to the helical blade being positioned to slant either away from or toward the direction of rotation of the shaft, said plate being constructed to flex with predetermined controlled pressure at the interior wall,
   (d) a flexible tip attached to the end of each segment and positioned and contoured such that by overlap of each tip with respect to the adjacent tip ends, all portions of the interior wall of the tubular vessel are contacted during a single revolution of the shaft.

2. The device of claim 1 in which the tubular vessel is a cylinder.

3. The device of claim 2 in which the plates of the agitator are positioned to slant toward the direction of rotation of the shaft.

* * * * *